US012037911B2

(12) United States Patent
Pieri

(10) Patent No.: US 12,037,911 B2
(45) Date of Patent: Jul. 16, 2024

(54) METHOD OF PROVIDING SEALING AND SEALING SYSTEM

(71) Applicant: Nuovo Pignone Tecnologie—S.r.l., Florence (IT)

(72) Inventor: Marco Pieri, Florence (IT)

(73) Assignee: Nuovo Pignone Tecnologie—S.r.l., Florence (IT)

( * ) Notice: Subject to any disclaimer, the term of this patent is extended or adjusted under 35 U.S.C. 154(b) by 776 days.

(21) Appl. No.: 16/628,174

(22) PCT Filed: Jul. 2, 2018

(86) PCT No.: PCT/EP2018/067810
§ 371 (c)(1),
(2) Date: Jan. 2, 2020

(87) PCT Pub. No.: WO2019/007907
PCT Pub. Date: Jan. 10, 2019

(65) Prior Publication Data

US 2020/0141261 A1 May 7, 2020

(30) Foreign Application Priority Data

Jul. 3, 2017 (IT) ........................ 102017000074311

(51) Int. Cl.
*F01D 11/14* (2006.01)

(52) U.S. Cl.
CPC ........ *F01D 11/14* (2013.01); *F05D 2300/501* (2013.01)

(58) Field of Classification Search
CPC .......... F01D 11/08; F01D 11/14; F01D 11/16; F05D 2300/501; F05D 2260/38;
(Continued)

(56) References Cited

U.S. PATENT DOCUMENTS 4,063,845 A * 12/1977 Allen .................... F01D 11/005 277/633
4,529,209 A * 7/1985 Nii ........................... F16J 15/40 277/401
(Continued)

FOREIGN PATENT DOCUMENTS

EP 1 331 362 A2 7/2003
GB 1 493 913 A 11/1977
(Continued)

OTHER PUBLICATIONS

International Search Report of the International Searching Authority for PCT/EP2018/067810 dated Sep. 10, 2018.

*Primary Examiner* — Eugene G Byrd
*Assistant Examiner* — L. Susmitha Koneru
(74) *Attorney, Agent, or Firm* — Paul Frank + Collins P.C.

(57) ABSTRACT

The sealing system (1) for a machine comprises: a sealing element (4) that is movable back and forth along a direction (D) and that comprises a first recess (41) with first and second surfaces (42, 43), a component (2) of an assembly of the machine that comprises a second recess (21) with first and second surfaces (22, 23), and an elastic element (5). The first and second recesses (41, 21) face each other. The elastic element (5) is partially housed inside the first recess (41) and partially housed inside the second recess (21) so to apply forces on the first and second surfaces (42, 22, 43, 23) depending on where the sealing element (4) is positioned with respect to the component (2).

12 Claims, 9 Drawing Sheets

(58) Field of Classification Search
CPC ...... F04D 29/164; F16J 15/3452; F16J 15/44; F16J 15/441; F16J 15/42; F16J 15/445; F16J 15/447; F16J 15/4472; F16J 15/4474; F16J 15/4476; F16J 15/4478
See application file for complete search history.

(56) References Cited

U.S. PATENT DOCUMENTS

| | | | | | |
|---|---|---|---|---|---|
| 5,172,918 | A * | 12/1992 | Pecht | F01D 11/003 277/400 |
| 5,374,068 | A * | 12/1994 | Jewett | F16J 15/441 277/303 |
| 6,250,641 | B1 * | 6/2001 | Dinc | F16J 15/3288 277/355 |
| 6,315,519 | B1 | 11/2001 | Bagepalli et al. | |
| 6,840,519 | B2 * | 1/2005 | Dinc | F16J 15/445 277/303 |
| 7,066,470 | B2 * | 6/2006 | Turnquist | F04D 29/102 277/355 |
| 7,704,041 | B2 * | 4/2010 | Adis | F01D 11/003 277/421 |
| 7,909,335 | B2 * | 3/2011 | Turnquist | F16J 15/3292 277/355 |
| 8,113,771 | B2 * | 2/2012 | Turnquist | F01D 11/025 277/411 |
| 8,864,443 | B2 * | 10/2014 | Narita | F01D 11/22 415/113 |
| 2003/0165382 | A1 | 9/2003 | Suzuki et al. | |
| 2004/0100035 | A1 * | 5/2004 | Turnquist | F16J 15/445 277/412 |
| 2005/0025617 | A1 | 2/2005 | Suzuki et al. | |
| 2007/0224037 | A1 | 9/2007 | Suzuki et al. | |
| 2007/0237628 | A1 * | 10/2007 | Adis | F16J 15/441 415/170.1 |
| 2012/0014778 | A1 * | 1/2012 | Narita | F01D 11/22 415/174.5 |
| 2015/0098808 | A1 * | 4/2015 | Morgan | F01D 11/003 415/173.1 |
| 2016/0208922 | A1 * | 7/2016 | Juh | F16J 15/30 |

FOREIGN PATENT DOCUMENTS

| | | | |
|---|---|---|---|
| GB | 2 344 140 | A | 5/2000 |
| JP | 2002070505 | A * | 3/2002 |

* cited by examiner

METHOD OF PROVIDING SEALING AND SEALING SYSTEM

DESCRIPTION

Technical Field

Embodiments of the subject matter disclosed herein correspond to methods of providing sealing, sealing systems, and machines using them.

Background Art

Machines often require sealing systems.

In the field of "Oil & Gas", the requirements for sealing systems of machines, in particular turbomachines, are very high.

During normal operation of a machine, clearance between a sealing element and a corresponding component of the machine should be as small as possible.

Anyway, in general, very small clearances make assembly of a machine more difficult.

Furthermore, in general, if there is a small clearance between a sealing element and a corresponding component of the machine, collisions between the element and the component are more likely to occur if, for any reason, the element and/or the component are not in their ideal positions. Non-ideal positions of the element and/or the component may be due for example to vibrations in the machine and to temperature distribution in the machine, more precisely to displacements/deformations caused by temperature distribution. Such collisions may cause damages to the element and/or the component.

It would be desirable to have small clearances without the above-mentioned drawbacks.

According to prior art solutions, for example disclosed in U.S. Pat. Nos. 5,603,510 and 8,113,771, a sealing element may move back if it is pushed by a component of the machine; such back-movement is counteracted by an elastic element. In this way, the likelihood of damages due to collisions or contact is reduced.

Anyway, these prior art solutions are not able to reduce the likelihood of collisions or contact between the sealing element and the component of the machine.

SUMMARY

First embodiments of the subject matter disclosed herein relate to methods of providing sealing.

According to such first embodiments, the method provides sealing inside a machine and comprises: moving a sealing element during operation of the machine so a fluid of the machine applies a pressure force on the sealing element in a first direction and an assembly of the machine applies a push force on the sealing element in a second direction; and balancing the pressure force and the push force, wherein said balancing results from an elastic element of the machine arranged to act on the sealing element so to counteract both the pressure force and the push force.

Second embodiments of the subject matter disclosed herein relate to sealing systems.

According to such second embodiments, the sealing system comprises: a sealing element being movable back and forth along a direction and comprising a first recess with a first surface and a second surface, a component of an assembly of the machine comprising a second recess with a first surface and a second surface, an elastic element; the first and second recesses face each other so that the first surface of the first recess is close to the first surface of the second recess and the second surface of the first recess is close to the second surface of the second recess; the elastic element is partially housed inside the first recess and partially housed inside the second recess so to apply forces on the first surfaces and the second surfaces depending on where the sealing element is positioned with respect to the component; a continuous peripheral surface formed by the assembly of the rotoric blade shrouds which together with the continuous peripheral surface formed by the sealing surface of the sealing element create a fluid chamber. A pressure force is generated by the pressure difference existing between the fluid chambers.

Third embodiments of the subject matter disclosed herein relate to machines.

According to such third embodiments, the machine, in particular a turbomachine and more in particular a steam turbine, implements the above-mentioned method and/or comprises the above-mentioned sealing system.

BRIEF DESCRIPTION OF DRAWINGS

The accompanying drawings, which are incorporated herein and constitute an integral part of the present specification, illustrate exemplary embodiments of the present invention and, together with the detailed description, explain these embodiments. In the drawings.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

It is to be noted that the present invention is typically applied to turbomachines, in particular steam turbines; anyway, application to other machines is not to be excluded.

Figure 1:
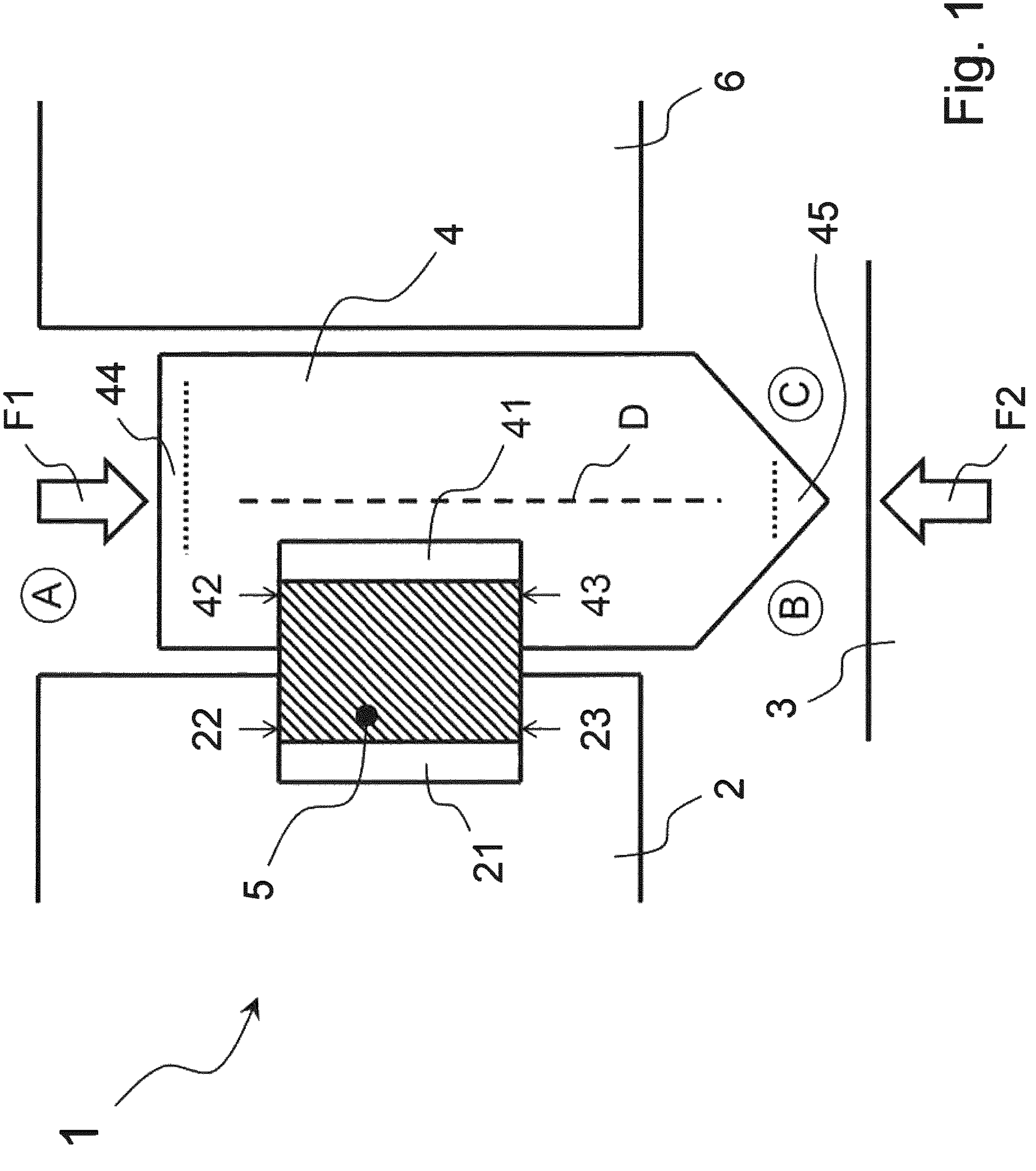
FIG. 1 shows a schematic longitudinal section view of an embodiment of a sealing system for explanatory purposes.

FIG. 1 shows very schematically a sealing system 1 in a machine; there is a first component 2 of the machine, a second component 3 of the machine, and a sealing element 4 that separates an internal zone B of the machine from an internal zone C of the machine and provides sealing against component 3; zone B contains a fluid and zone C contains a fluid. Typically, zones B and C contain the same fluid. Typically, the pressure of the fluid in zone B is different from the pressure of the fluid in zone C.

Sealing element 4 may move during operation of the machine; in particular, it may move back and forth along a direction D (the vertical direction in FIG. 1).

In FIG. 1, there is a third component 6 of the machine; components 2 and 6 may be components of the same assembly of the machine.

In the embodiment of FIG. 1, component 2 and 6 define a guide where element 4 may slide along a direction D.

In the embodiment of FIG. 1, component 2, component 6 and element 4 (in particular its surface 44) contribute to define an internal cavity A of the machine that is positioned on a first side of element 4 and that is designed to contain pressurized fluid during operation of the machine.

On the second side of element 4, there is a sealing surface 45 facing component 3.

Component 2 is typically stationary, during operation of the machine.

Component 3 may be stationary or movable, e.g. rotary, during operation of the machine.

Component 6 is typically stationary, during operation of the machine.

Sealing element 4 comprises a recess 41 with a first surface 42 (the upper surface in FIG. 1) and a second surface 43 (the lower surface in FIG. 1); surface 43 is opposite to surface 42.

Component 2 comprises a recess 21 with a first surface 22 (the upper surface in FIG. 1) and a second surface 23 (the lower surface in FIG. 1); surface 23 is opposite to surface 22.

There is also an elastic element 5; typically, the sealing system comprises a plurality of elastic elements, for example, two or three or four or five or six or seven or eight or more.

Recesses 21 and 41 face each other so that surface 22 is close to surface 42 and remote from surface 43 and so that surface 23 is close to surface 43 and remote from surface 42 at any time. When the machine is not in operation (e.g. FIG. 3) surface 22 is perfectly aligned with surface 42 and surface 23 is perfectly aligned with surface 43. When the machine is in operation (e.g. FIG. 4 and FIG. 5) surface 22 is substantially aligned with surface 42 and surface 23 is substantially aligned with surface 43.

Figure 2:
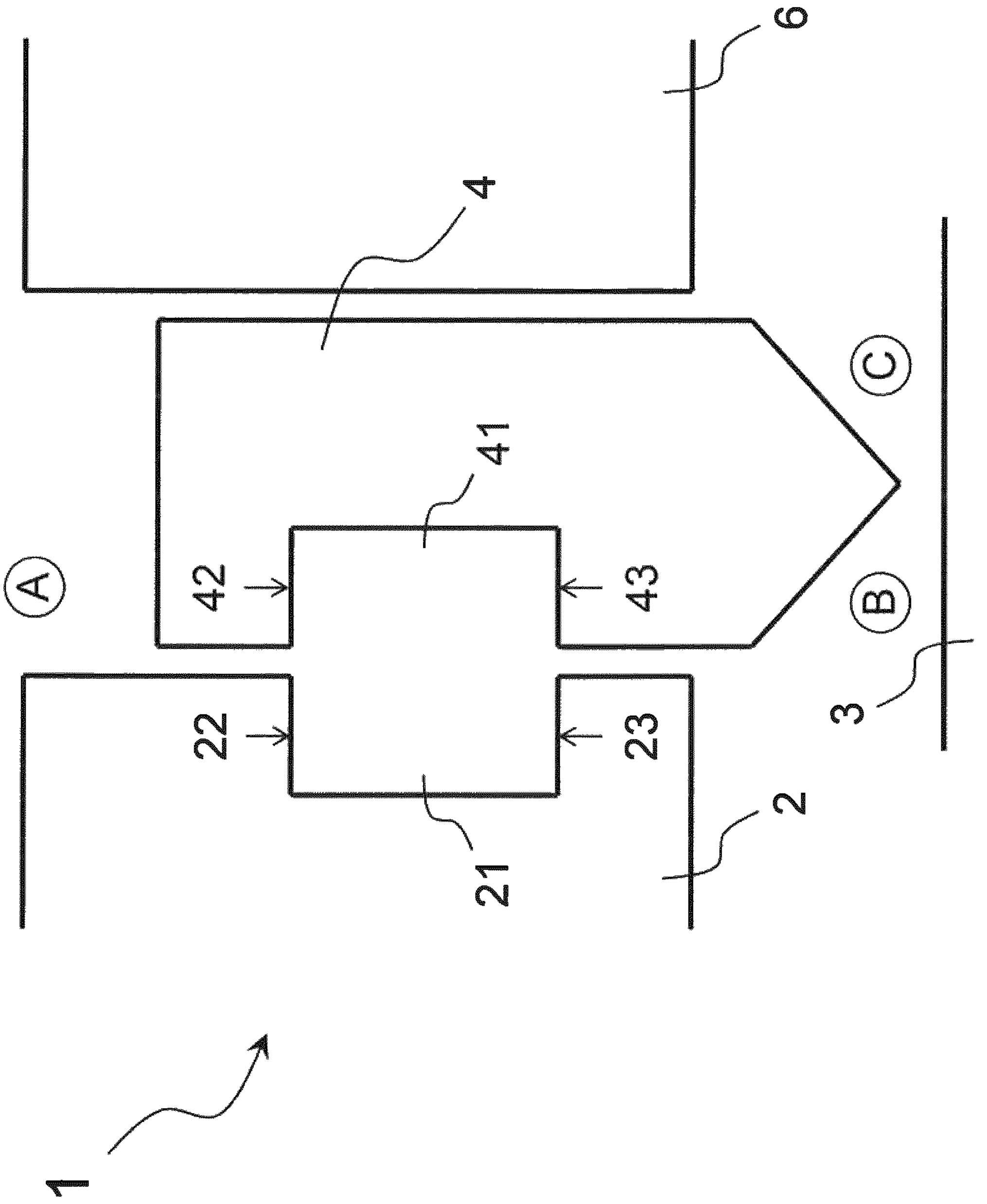
FIG. 2 shows a view corresponding to FIG. 1 with some simplifications and without an elastic element.

Elastic element 5 is partially housed inside recess 21 and partially housed inside recess 41 (see FIG. 1) so to apply forces on surfaces 42, 43, 22, 23 depending on where sealing element 4 is positioned with respect to component 2. For example: in the position shown in FIG. 3, it applies small forces contemporaneously on all surfaces 42, 43, 22, 23 as it is preferably slightly pre-compressed; in the position shown in FIG. 4, it applies forces contemporaneously on all surfaces 23, 42 (but not on surfaces 22, 43); in the position shown in FIG. 5, it applies forces contemporaneously on all surfaces 22, 43 (but not on surfaces 23, 42). Element 5 is inserted partially inside recess 21 and partially recess 41—compare FIG. 2 and FIG. 3; it is to be noted that according to the embodiment of FIG. 3 there are lateral gaps between element 5 and elements 2 and 4, but their sizes may be very small and are exaggerated in FIG. 3.

It is to be noted that when the machine is in operation sealing element 4 may change its position; the position shown in FIG. 4 may be its lowermost position (for example closest to the rotation axis of the machine) and the position shown in FIG. 5 may be its uppermost position (for example farthest from the rotation axis of the machine); this will be explained better in the following.

Sealing element 4 is movable during operation of the machine due to pressure force F1 (see arrow in FIG. 1) on sealing element 4 in a first direction by a fluid of the machine, typically a working fluid of the machine, and due to any push force F2 (see arrow in FIG. 1) on sealing element 4 in a second direction by component 3; the second direction is opposite to the first direction. A push force F2 acts on element 4 only if element 4 gets in contact with component 3; under regular conditions, this should not happen. A pressure force F1 acts on element 4 at any time during operation, for example during rotation of a turbomachine; there is no pressure force F1 when the machine is not in operation.

Elastic element 5 acts on sealing element 4 and arranged so to counteract both pressure force F1 and push force F2.

As can be seen in FIG. 1, in general, there are three different pressures in zones A, B and C; the magnitude of force F1 depends on these three pressures and on the areas subject to these pressures; force F1 may be considered to act on a first side of sealing element 4, in particular actuation surface 44; force F2 may be considered to act on a second side of sealing element 4, in particular sealing surface 45. According some typical embodiments, during operation of the machine, pressure in zone A is almost equal to pressure in zone B and greater than pressure in zone C (for example cavity A is in fluid communication with zone B) or pressure in zone A is almost equal to pressure in zone C and greater than pressure in zone B (for example cavity A is in fluid communication with zone C). According to other embodiments, during operation of the machine, pressure in zone A is greater than pressure in zone B and pressure in zone C; in these cases, cavity A is in fluid communication with a source of pressurized fluid.

It is to be noted that pressures in zones A, B and C may vary during operation of the machine.

Figure 3:
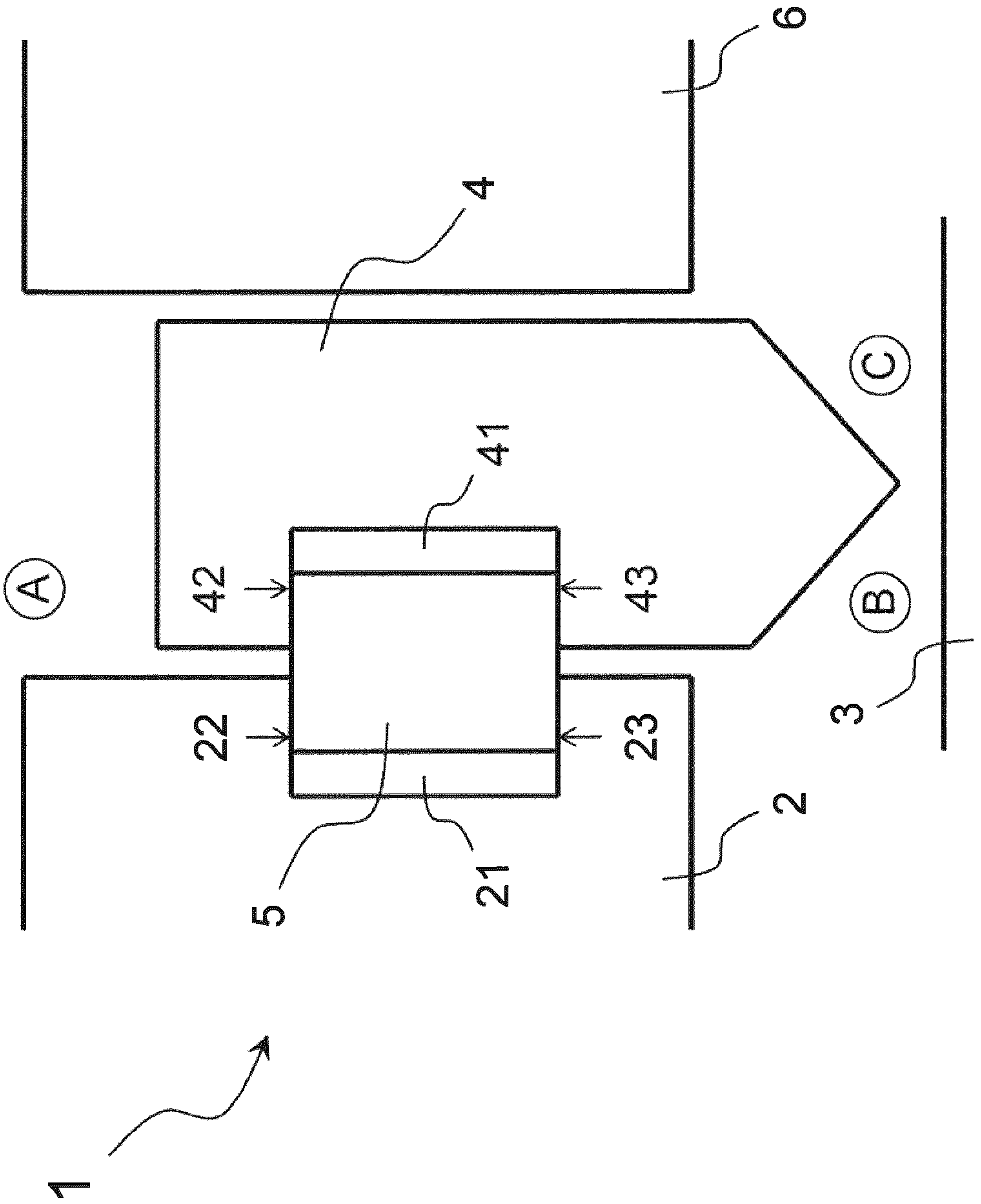
FIG. 3 shows a view corresponding to FIG. 2 with a substantially uncompressed elastic element.

When the machine is not in operation, the pressure in zones A, B and C is approximately equal to atmospheric pressure and sealing element 4 is in the position shown in FIG. 3; sealing surface 45 is at a relatively large distance from the surface of component 3; there is a large clearance, and therefore assembly is easy.

Figure 4:
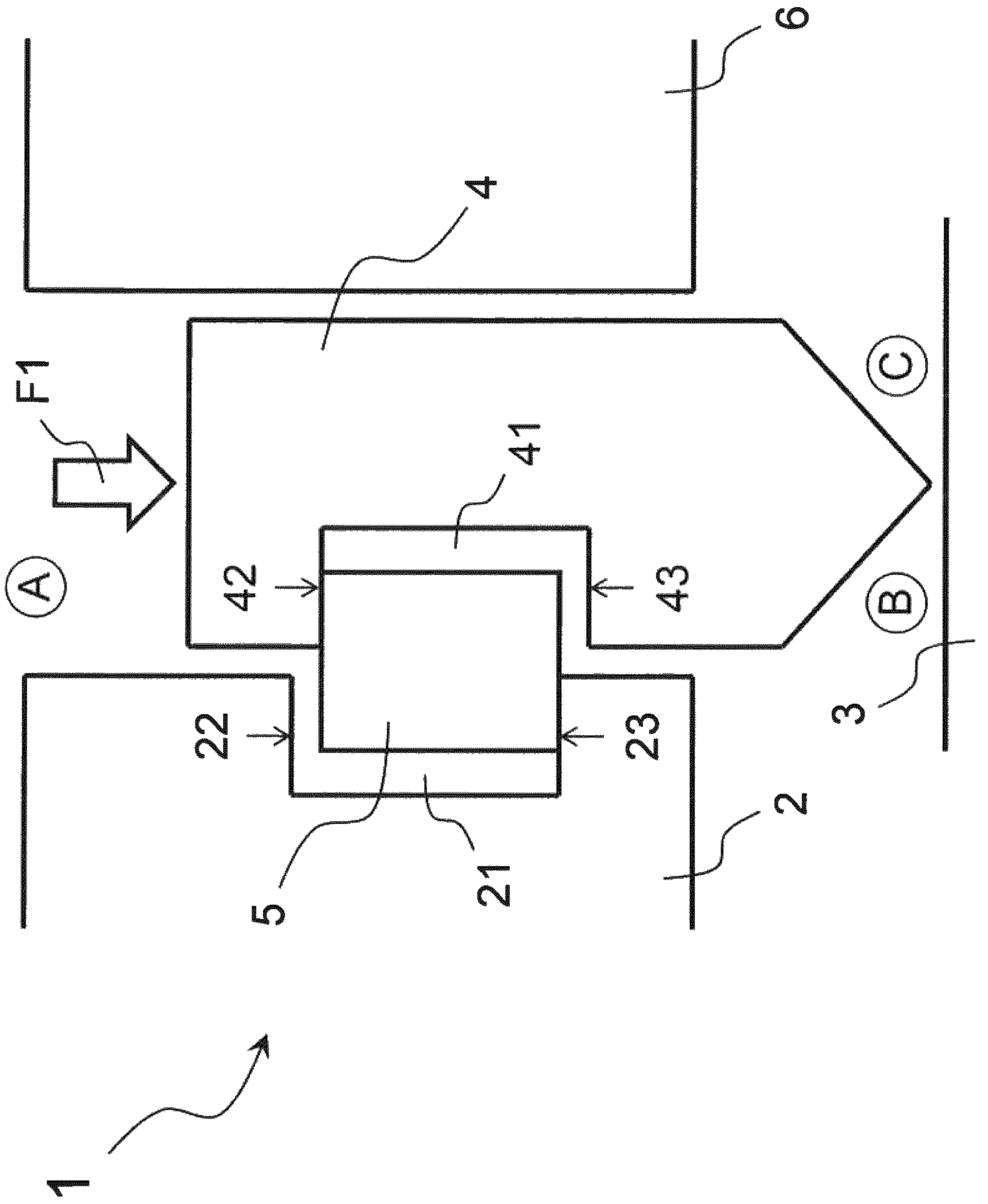
FIG. 4 shows a view corresponding to FIG. 2 with an elastic element compressed by a pressure force.

When the machine is in operation, such a pressure should be created in zone A (with respect to the pressures in zones B and C) so that sealing element 4 moves toward component 3 as shown in FIG. 4; sealing surface 45 is at a relatively small distance from the surface of component 3—the small distance is such that pressure force F1 is equal and opposite elastic force due to element 5; there is a small clearance, and therefore the performances of the machine are good even if there is a small leakage between zones B and C.

The clearance may be controlled through the pressure in zone A. Therefore, the clearance may be adapted to the operating conditions of the machine. It is to be noted that, for example, during ramp-up and ramp-down of a turbomachine, vibrations occur so it is desirable to have larger clearances in order to reduce risk of collision between rotary parts and stationary parts. It is to be noted that, during cooling-phase low-speed turning of a turbomachine, nonuniform deformations occur so it is desirable to have larger clearances in order to reduce risk of collision between rotary parts and stationary parts.

Figure 5:
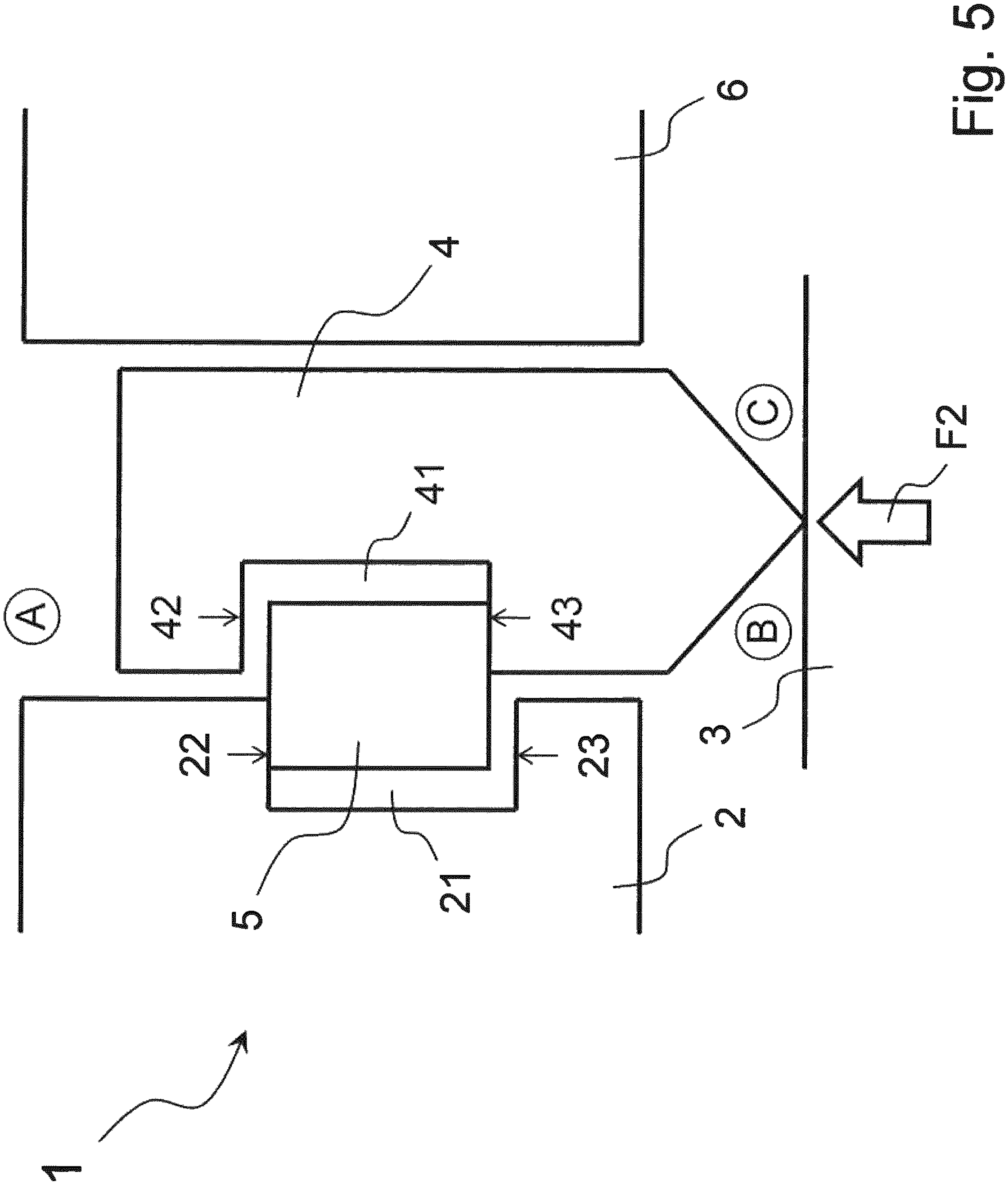
FIG. 5 shows a view corresponding to FIG. 2 with an elastic element compressed by a push force.

If, for any reason and although the above-described clearance regulation, element 3 collides with sealing element 4, due to a change in the position of element 2 and/or element 3, element 4 may move back as shown in FIG. 5 and such collision will not cause damages either to component 3 or to sealing element 4. In this case, elastic element 5 absorbs the shock. As can be seen in FIG. 5, there is a lot of room for the back movement of element 4.

FIGS. 1-5 shows cross-sections.

Figure 6:
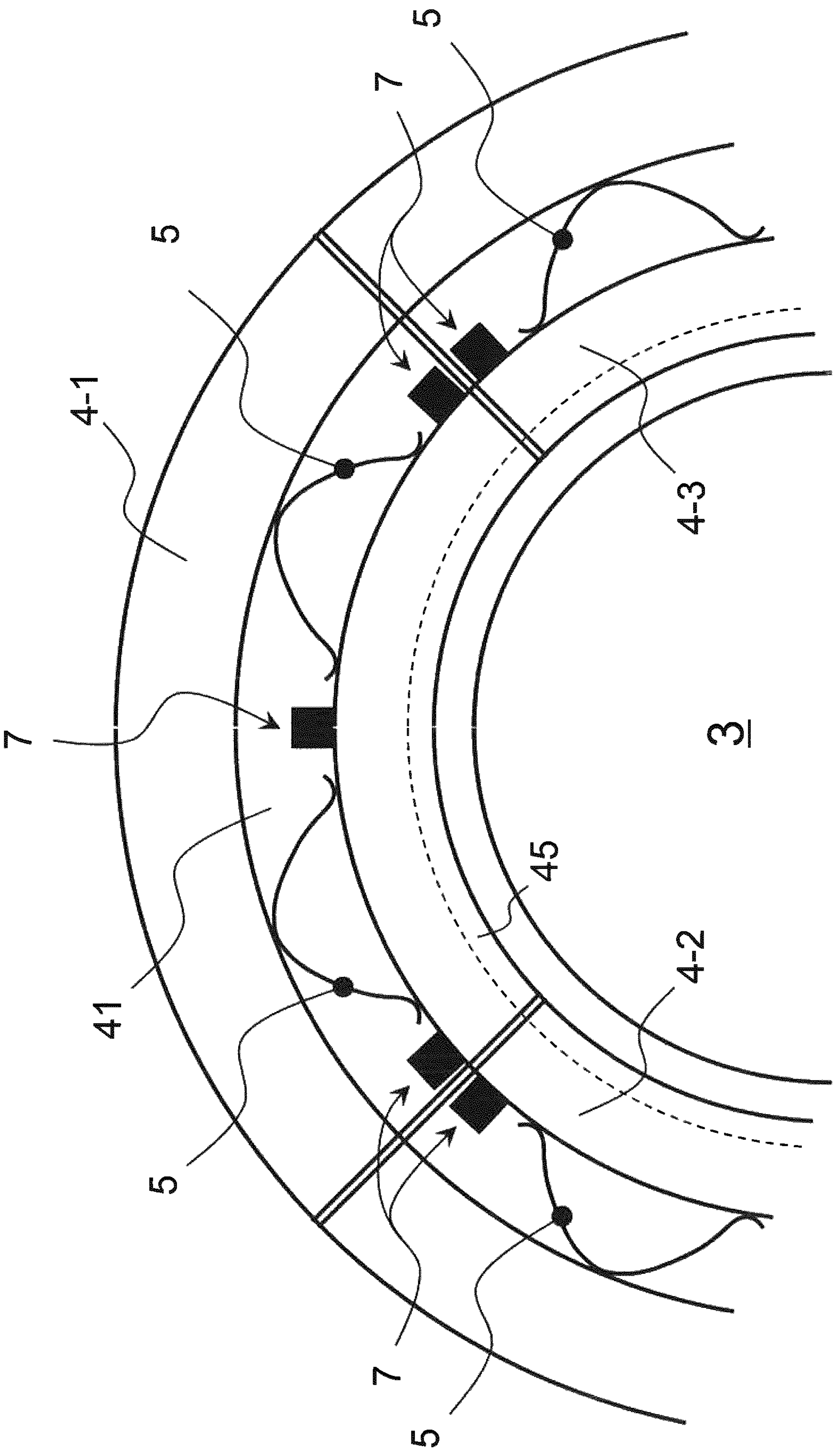
FIG. 6 shows a schematic cross-section view of the embodiment of FIG. 1.

The sealing element according to the present invention may comprise one or more linear elongated elements, but, more typically, may comprise one or more arc-shaped elongated elements for example as element 4 shown in FIG. 6.

The sealing system of FIG. 6 comprises four arc-shaped elongated sealing elements; each of them is circular-shaped and about 90° wide so it may be called an "sealing element sector" or "element sector"; FIG. 6 completely shows one of them in front view, i.e. element sector 4-1, and partially shows two of them in front view, i.e. element sectors 4-2 and 4-3 on opposite sides of element sector 4-1. Such system provides circumferential sealing. A different number of the element sectors (typically equally wide) is possible for example any number from two to twenty.

Each of the sealing elements of FIG. 6 comprises an arc-shaped recess 41 all along its length; the cross-section of the element is uniform, i.e. it is the same all along its length (see FIGS. 1-5).

Each of the sealing elements of FIG. 6 is associated for example with two elastic elements 5 partially housed inside recess 41. In FIG. 6, each elastic element 5 is a "moustache spring" which is highly advantageous; a moustache-shape spring comprises one big-size arc between two small-size arcs curved oppositely to the big-size arc.

A different advantageous number and/or a different advantageous shape of the spring is possible; for example, the or each spring may be "wave spring" or "plate spring"; a "plate spring" is similar to a "moustache spring" but instead of the two small-size arcs it comprises two straight segments.

Such elongated shapes of the sealing elements allow to achieve big deformations of the spring with respect to the rest size of the spring; for example, considering FIG. 3, if the distance between surfaces 42 and 43 is 4.5 mm, deformation of element 5 may reach 1.5 mm.

Other less advantageous shapes are for example helicoidal spring, cup spring, disk spring, strip spring.

FIG. 6 shows schematically also elements 7 that are stop elements; the stop elements are positioned in recesses 21 and 41 and arranged so to avoid slipping of elastic elements 5 along the recesses. In FIG. 6, for example, there are three stop elements 7 associated to recess 41 of element sector 4-1: two of them at the ends of recess 41 and one of them at an intermediate position of recess 41. As can be seen in FIG. 6, when springs 5 are not radially compressed, there is some backlash between the ends of the springs and the stop elements; on the contrary, when the springs 5 are highly radially compressed, the ends of the springs are in contact with the stop elements; in other words, when spring 5 is compressed transversally (i.e. radially, in the embodiment of FIG. 6) it may expand longitudinally (i.e. circumferentially, in the embodiment of FIG. 6) thank to the above-mentioned backlashes.

The solution just described has several advantages with respect to the prior-art solution according to U.S. Pat. No. 5,603,510. For example, only one elastic element is necessary instead of three elastic elements in the prior-art solution (see e.g. elements 203*a*, 203*b*, 209 in FIG. 1), the design is very compact while space is necessary above and below a flange of the moving sealing element prior-art solution (see e.g. flange 123 inside cavity 107 in FIG. 2), perfect positioning of the sealing element with respect to the case is obtained automatically while positioning of the sealing element depends on the elastic constants of the three springs in the prior-art solution (see e.g. FIG. 2).

The solution just described has several advantages with respect to the prior-art solutions according to U.S. Pat. No. 8,113,771 similarly to the prior-art solution according to U.S. Pat. No. 5,603,510. In particular, it is much simpler.

In the following, reference is particularly made to FIG. 7, FIG. 8 and FIG. 9 that refer to an embodiment similar to the one of FIGS. 1-6; therefore, many considerations (e.g. on pressures, forces, etc.) already set out in relation to the previous embodiment also apply to the present embodiment.

Figure 7:
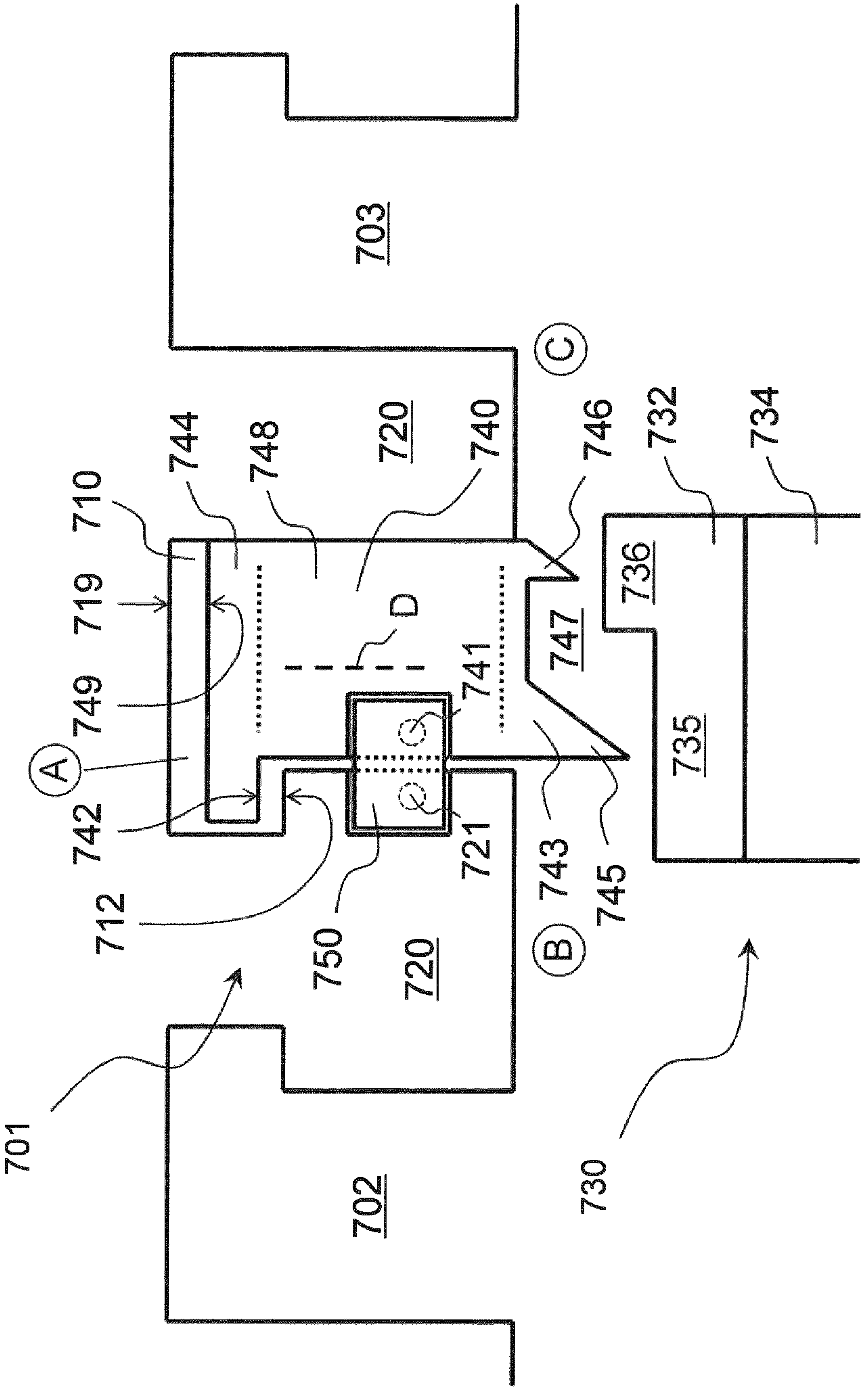
FIG. 7 shows a schematic longitudinal section view of another embodiment of a sealing system.

FIG. 7 shows a partial longitudinal cross-section view of a sealing system 701 in particular for a steam turbine comprising a sealing element 740 that is arc-shaped (similarly to FIG. 6) and at least one elastic element 750 that is partially housed in a recess 741 of element 740 that is also arc-shaped (similarly to FIG. 6). A continuous peripheral surface formed by the assembly 3 of the rotoric blade shrouds 735 and 736 which together with the continuous peripheral surface formed by the sealing surface 45 of the sealing element 4 create a fluid chamber 747, where the sealing surface 45 faces the rotoric blade shrouds 735 and 736. The pressure force F1 is generated by the pressure difference existing between the fluid chamber A and the fluid chamber 747.

Figure 8:
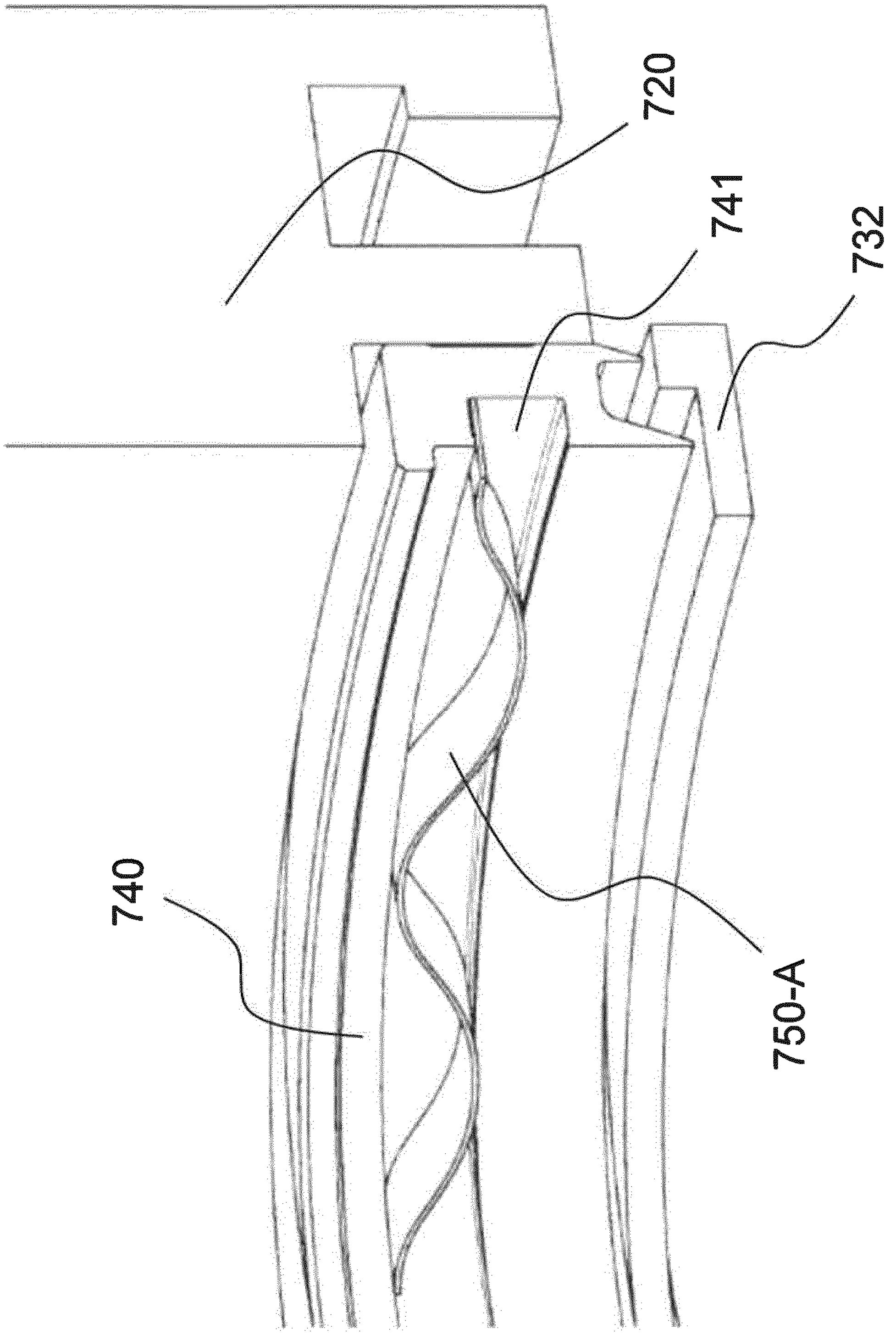
FIG. 8 shows a tridimensional partial view of the embodiment of FIG. 7 according to a first possibility (i.e. first embodiment of the elastic element)

FIG. 8 shows a tridimensional partial view of the embodiment of FIG. 7 according to a first possibility, i.e. with the elastic element being a wave spring 750-A.

Figure 9:
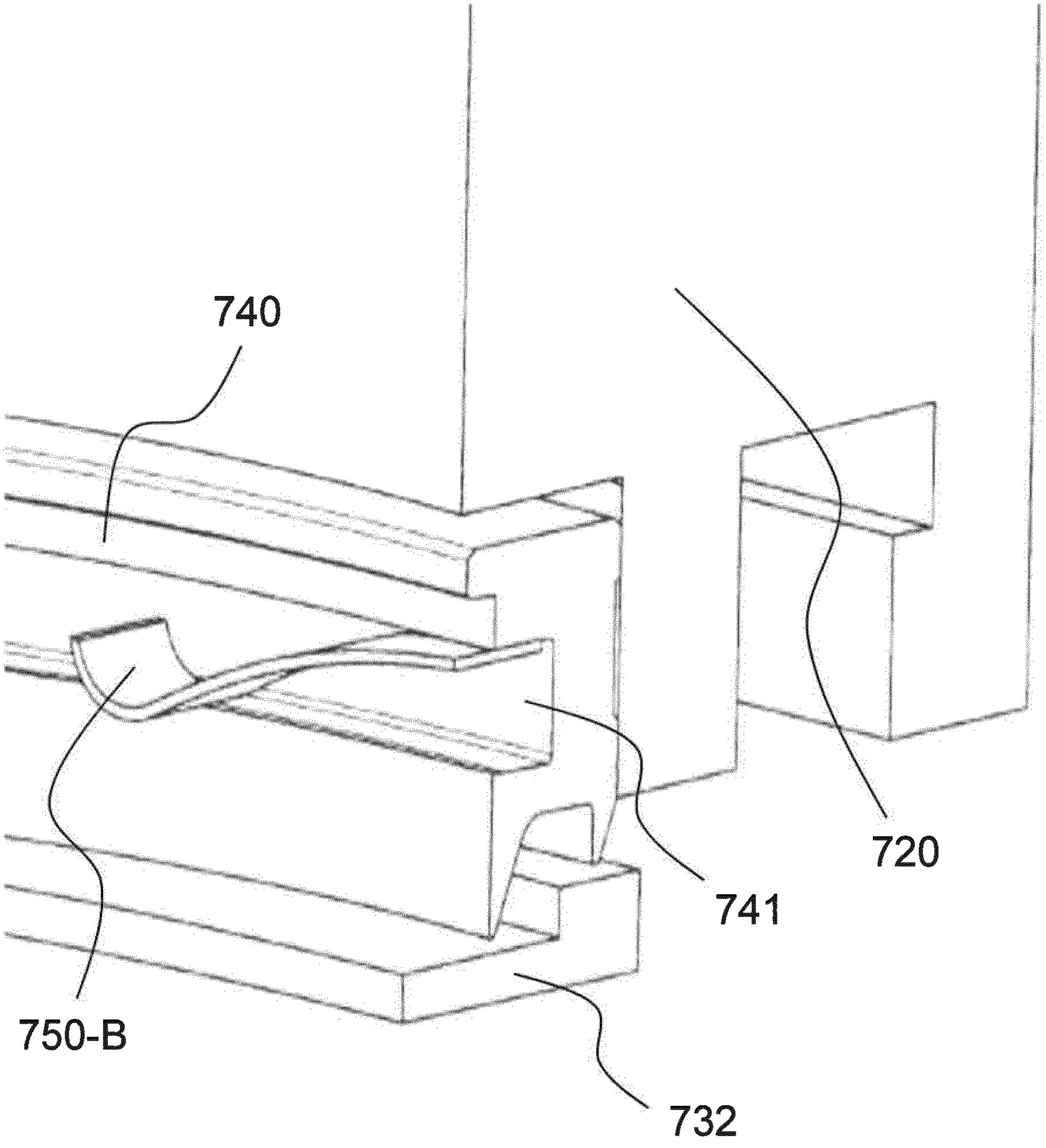
FIG. 9 shows a tridimensional partial view of the embodiment of FIG. 7 according to a second possibility (i.e. second embodiment of the elastic element).

FIG. 9 shows a tridimensional partial view of the embodiment of FIG. 7 according to a second possibility, i.e. with the elastic element being a moustache spring 750-B. FIG. 9 shows only one half of a moustache spring; other moustache springs are present according to this second possibility inside recesses 721 and 741.

While describing the embodiment of FIGS. 7-9, the word "inner" means "closer to the rotation axis of the turbine", "inward" means "toward the rotation axis of the turbine", "outer" means "farther to the rotation axis of the turbine", "outward" means "away from the rotation axis of the turbine".

FIG. 7 shows a portion of a case 720 of a steam turbine stator assembly wherein a sealing system 701 is mounted. There are a first seat 702 for a first set of stator blades (on the left of system 701) of a steam turbine stator assembly and a second seat 703 for a second set of stator blades (on the right of system 701) of a steam turbine stator assembly. The sealing system 701 is at a shroud portion 732 of a steam turbine rotor assembly 730; in the figure, only an outer part of a rotor blade 734 is shown; by way of example, shroud portion 732 comprises one inner surface 735 and axially spaced one outer surface 736 with a step in between; the pressure upstream rotor assembly 730 (i.e. on the left of figure) is higher than the pressure downstream rotor assembly 730 (i.e. on the right of figure).

Sealing system 701 is almost completely housed inside a seat of case 720, i.e. a cavity 710, located between seats 702 and 703 and axially spaced therefrom; only an inner portion 743 of a sealing element 740 of sealing system 701 projects inwardly from the seat; inner portion 743 is a labyrinth seal with e.g. two sealing surfaces 745 and 746 and a recessed chamber 747 in between.

Cavity 710 comprises an outer portion (on the top in the figure) and an inner portion (on the bottom in the figure); the outer portion is slightly bigger (circumferentially) that the inner portion. Considering the cross-section view of FIG. 7, the cross-sections of outer portion and the inner portion of cavity 710 are rectangles; on a first side (on the right in the figure), the lateral sides of the rectangles are aligned and, on a second side (on the left in the figure), the lateral side of the inner rectangle is recessed with respect to the lateral side of the outer rectangle; due to the different size of the cavity portions, there is at least one surface 712 that may be used as stop surface for sealing element 740; also an outer surface 719 of the outer portion of cavity 710 may be used as stop surface for sealing element 740.

Sealing element 740 comprises an intermediate or body portion 748, an inner portion 743 (already described above) and an outer portion 744; the outer portion is slightly bigger (circumferentially) that the intermediate portion. Considering the cross-section view of FIG. 7, the cross-sections of outer portion and the inner portion of element 740 are rectangles; on a first side (on the right in the figure), the lateral sides of the rectangles are aligned and, on a second side (on the left in the figure), the lateral side of the inner rectangle is recessed with respect to the lateral side of the outer rectangle; due to the different size of the sealing element portions, there is at least one surface 742 of outer portion 744 of sealing element 740 that may be used as stop or abutment surface for sealing element 740; also an outer surface 749 of outer portion 744 of sealing element 740 may be used as stop or abutment surface for sealing element 740.

Sealing element 740 comprises a lateral recess 741. Case 720 comprises a lateral recess 721. At least one elastic element 750 is partially housed inside recesses 721 and 741; elastic element 750 is positioned and acts similarly to FIGS. 1-6 wherein elastic element has reference number 5 and the recesses have reference numbers 21 and 41. Elastic element 750 is arranged to contact both case 720 and element 740 in the radial direction (vertical direction in the figure) and apply radial forces on them; in the axial direction (horizontal direction in the figure, elastic element 750 either contacts or is very close to both case 720 and element 740, but does not apply appreciable axial forces on them.

Sealing element 740 is arranged to slide back and forth along a direction D similarly to the embodiment of FIGS. 1-6; more precisely, the intermediate portion 748 of sealing element 740 is guided by and slides inside the inner portion of cavity 710 while the outer portion 744 of sealing element 740 is guided by and slides inside the outer portion of cavity 710.

As can be seen in FIG. 7, a first lateral clearance between sealing element 740 and case 720 (on the right of the figure) is zero or close to zero and does not allows fluid communication between cavity 710, in particular zone A between surfaces 719 and 749, and zone C of the turbine downstream assembly 730, while a second lateral clearance between sealing element 740 and case 720 (on the left of the figure) and does allow fluid communication between cavity 710, in particular zone A between surfaces 719 and 749, and zone B of the turbine upstream assembly 730.

Sealing surface 745 faces inner surface 735 of shroud portion 732 and sealing surface 746 faces outer surface 736 of shroud portion 732.

The pressure inside chamber 747 is intermediate between the upstream pressure on a first side of assembly 730, i.e. zone B, and the downstream pressure on a second side of assembly 730, i.e. zone C.

Sealing element 740 moves due to any radial pressure force and any radial push force counteracted by the elastic element 750.

Additionally, the movement of sealing element 740 is limited in the radial direction by one or two stops. In the embodiment of FIG. 7, sealing element may move radially toward the rotor assembly 730 till its surface 742 abuts against surface 712. In the embodiment of FIG. 7, sealing element may move radially away from the rotor assembly 730 till its surface 749 abuts against surface 719.

A sealing system according to the present invention is typically applied to turbomachines, in particular steam turbines; anyway, application to other machines is not to be excluded.

Referring for example to FIG. 7, sealing system like system 701 may be located at a stage of a turbine, in particular steam turbines. In the case of FIG. 7, element 732 is a shroud of a rotor 730, and element 740 separates a higher pression region of the turbine (on the left in the figure) from a lower pression region of the turbine (on the right in the figure), and the sealing system provides sealing against the rotor of the machine.

Different positioning of the sealing system is not to be excluded.

The invention claimed is:

1. A sealing system for a machine, the sealing system comprising: a sealing element movable back and forth along a direction, the sealing element comprising a body with an outer surface forming a first recess with a first radial surface and a second radial surface, the body having an end forming a sealing surface;

a component of an assembly of the machine comprising an inner surface adjacent to and spaced apart from the outer surface of the sealing element, the inner surface forming a second recess with a first radial surface and a second radial surface;

an elastic element independent from each of the sealing element and the component; and a rotor assembly comprising a rotoric blade and a shroud, disposed on an end of the rotoric blade, the shroud having a stepped surface proximate the sealing surface, wherein the end of the body of the sealing element forms a first protrusion and a second protrusion, which is shorter than the first protrusion, wherein the first protrusion and the second are spaced apart from one another to form a recess therebetween, wherein the shroud aligns with the body of the sealing element so that the first step and the second step of the stepped surface of the shroud together contact the first protrusion and the second protrusion, respectively, and together create a fluid chamber about the shoulder, the stepped surface forming a first step, a second step, and a shoulder disposed therebetween, wherein the first and second recesses face each other so that the first radial surface of the first recess is close to the first radial surface of the second recess and the second radial surface of the first recess is close to the second radial surface of the second recess, and wherein the elastic element resides inside both the first recess and the second recess and is in contact with at least one radial surface of each of the first recess and the second recess so to apply force on the first radial surfaces and the second radial surfaces depending on where the sealing element is positioned with respect to the component.

2. The sealing system of claim 1, wherein when the sealing element is in a position selected between a first set of positions the elastic element applies a force on the first surface of the first recess and on the second surface of the second recess, and wherein when the sealing element is in a position selected between a second set of positions the elastic element applies a force on the second surface of the first recess and on the first surface of the second recess.

3. The sealing system of claim 1, wherein when the sealing element is in a predetermined position, the elastic element is configured to apply a force on the first and second surfaces of the first recess and on the first and second surfaces of the second recess, and wherein when the sealing element is in the predetermined position the first and second recesses face each other so that the first surface of the first recess is aligned with the first surface of the second recess and the second surface of the first recess is aligned with the second surface of the second recess.

4. The sealing system of claim 1, wherein the elastic element is a wave spring or a moustache spring.

5. The sealing system of claim 1, wherein the elastic element is elongated-shape and arranged to expand longitudinally when compressed transversally.

6. The sealing system of claim 1, wherein the component comprises a cavity and the sealing element is arranged to slide inside the cavity.

7. The sealing system of claim 6, wherein the cavity comprises a cavity stop surface, wherein the sealing element comprises an element stop surface, and wherein the sealing element is arranged to slide inside the cavity in a sense of the direction till the element stop surface abuts against the cavity stop surface.

8. The sealing system of claim 7, wherein the cavity comprises another cavity stop surface, wherein the sealing element comprises another element stop surface, and wherein the sealing element is arranged to slide inside the cavity in a second sense of the direction till the another element stop surface abuts against the another cavity stop surface.

9. The sealing system of claim 1, wherein the sealing element comprises two sealing surfaces separated by the fluid chamber.

10. The sealing system of claim 1, wherein the sealing element is arc-shaped, wherein the first and second recesses are arc-shaped, and wherein the direction is radial.

11. The sealing system of claim 1, comprising a first number of sealing elements, wherein each of the sealing elements is associated to a second number of elastic elements.

12. The sealing system of any of claim 1, comprising a third number of stop elements, positioned in the first recess and/or in the second recess, and arranged so to avoid slipping of the elastic elements along the first and second recesses.

* * * * *